(12) United States Patent
Pereira

(10) Patent No.: US 7,404,002 B1
(45) Date of Patent: Jul. 22, 2008

(54) METHOD AND SYSTEM FOR BROADCASTING LIVE DATA OVER A NETWORK

(75) Inventor: Mark Anthony Pereira, Livermore, CA (US)

(73) Assignee: NVIDIA Corporation, Santa Clara, CA (US)

( * ) Notice: Subject to any disclaimer, the term of this patent is extended or adjusted under 35 U.S.C. 154(b) by 841 days.

(21) Appl. No.: 10/384,232

(22) Filed: Mar. 6, 2003

(51) Int. Cl.
G06F 15/16 (2006.01)
G06F 15/167 (2006.01)

(52) U.S. Cl. ............... 709/231; 709/203; 709/216; 709/219

(58) Field of Classification Search ......... 709/203, 709/216, 217, 219, 231, 239
See application file for complete search history.

(56) References Cited

U.S. PATENT DOCUMENTS

| | | | |
|---|---|---|---|
| 5,377,327 A | 12/1994 | Jain et al. | 395/200 |
| 5,455,569 A | 10/1995 | Sherman et al. | 340/825.02 |
| 5,559,933 A | 9/1996 | Boswell | 395/114 |
| 5,590,118 A | 12/1996 | Nederlof | 370/218 |
| 5,751,336 A * | 5/1998 | Aggarwal et al. | 725/146 |
| 5,778,187 A | 7/1998 | Monteiro et al. | 395/200.61 |
| 5,790,958 A | 8/1998 | McCoy et al. | 455/557 |
| 5,850,396 A | 12/1998 | Gilbert | 370/390 |
| 5,852,714 A | 12/1998 | Tseng et al. | 395/187.01 |
| 5,854,892 A | 12/1998 | Liu et al. | 395/200.34 |
| 5,884,031 A * | 3/1999 | Ice | 709/203 |
| 5,948,070 A | 9/1999 | Fujita | 709/243 |
| 5,949,411 A | 9/1999 | Doerr et al. | 345/327 |
| 6,081,840 A | 6/2000 | Zhao | 709/224 |
| 6,084,510 A | 7/2000 | Lemelson et al. | 340/539 |
| 6,105,145 A | 8/2000 | Morgan et al. | 713/501 |
| 6,122,259 A | 9/2000 | Ishida | 370/260 |
| 6,185,598 B1 * | 2/2001 | Farber et al. | 709/200 |
| 6,189,039 B1 * | 2/2001 | Harvey et al. | 709/232 |
| 6,195,680 B1 | 2/2001 | Goldszmidt et al. | 709/203 |
| 6,222,821 B1 | 4/2001 | Sees et al. | 370/227 |
| 6,249,810 B1 * | 6/2001 | Kiraly | 709/217 |
| 6,393,468 B1 | 5/2002 | McGee | 709/218 |
| 6,400,407 B1 | 6/2002 | Zigmond et al. | 348/465 |
| 6,434,622 B1 | 8/2002 | Monteiro et al. | 709/231 |

(Continued)

FOREIGN PATENT DOCUMENTS

EP   0851364 A2   7/1998

(Continued)

OTHER PUBLICATIONS

"Pipe Dream announces breakthrough Internet technology", Business Wire, Nov. 11, 1996.*

(Continued)

*Primary Examiner*—Nathan J. Flynn
*Assistant Examiner*—Jerry Dennison

(57) ABSTRACT

Method and system for broadcasting live data over a network are described. In one embodiment, live data is accessed. Next, a first client is authenticated. The live data is then broadcast to a first client, wherein the first client is capable of buffering and re-transmitting the live data. Next, a second client is authenticated. A list of clients receiving the live data is then sent to the second client. The second client then selects the first client from the list, contacts the first client, and then receives the live data from the first client.

14 Claims, 7 Drawing Sheets

U.S. PATENT DOCUMENTS

| | | | |
|---|---|---|---|
| 6,633,901 B1* | 10/2003 | Zuili | 709/203 |
| 6,718,361 B1* | 4/2004 | Basani et al. | 709/201 |
| 6,859,839 B1* | 2/2005 | Zahorjan et al. | 709/231 |
| 6,901,604 B1* | 5/2005 | Kiraly | 725/93 |
| 6,970,937 B1* | 11/2005 | Huntington | 709/231 |
| 7,035,933 B2* | 4/2006 | O'Neal et al. | 709/233 |
| 2002/0059592 A1* | 5/2002 | Kiraly | 725/37 |
| 2004/0143672 A1* | 7/2004 | Padmanabham et al. | 709/231 |
| 2006/0253747 A1* | 11/2006 | Gillies et al. | 714/712 |

FOREIGN PATENT DOCUMENTS

| | | |
|---|---|---|
| WO | WO97/48051 | 12/1997 |
| WO | WO99/38266 | 7/1999 |
| WO | WO00/49743 | 8/2000 |

OTHER PUBLICATIONS

Edmund X. Dejesus, How the Internet Will Replace Broadcasting, Peterborough, NH, US.

Borko Furht, Raymond Westwater and Jeffrey Ice, IP Simulcast: A New Technique for Multimedia Broadcasting Over the Internet, Journal of Computing and Information Technology.

* cited by examiner

METHOD AND SYSTEM FOR BROADCASTING LIVE DATA OVER A NETWORK

FIELD OF THE INVENTION

Embodiments of the present invention relate to broadcasting live data. More specifically, embodiments of the present invention relate to methods and systems for broadcasting live data over a network.

BACKGROUND ART

Presently, computer systems and networks are utilized in many facets of daily life. For example, computer systems and networks are common both at home and in the workplace to increase output as well as provide user convenience and entertainment. One major utilization of computer systems is the broadcasting of live content over a network. For example, games are played on a network such as the internet wherein a server acts as the source of the game and a plurality of gamers (or players) connect directly with the server to play the game. Another example of live content broadcast is found in teleconferencing and virtual meetings.

As illustrated in Prior Art FIG. 1, in live content formats, a source 110 is being captured. As the content is captured, for example by an Internet camera, it is routed to a server 105 where it is fed into an encoder 150. Once the content is encoded it is transmitted (e.g., transmitter 130) via network 100 (e.g., the Internet) over a plurality of dedicated streams (e.g., 140 through 142) to all clients 120. Therefore, each client 120 has the opportunity to view the broadcast as it is happening. That is, each client 120 may see or hear what is said or done in real time with only a minimal delay or no delay at all.

However, one disadvantage to this approach is its inefficiency. Specifically, a dedicated stream (e.g., 140 through 142) is necessary per client 120. Therefore, it is appreciated that if a server has a substantial number of clients watching the live video stream, there may be no room to add additional clients. For example, server 105 may have bandwidth requirements that allow only a certain number of clients 120 to receive a certain quality bandwidth. Once the maximum number of clients 120 are reached, the server denies access to other clients 120 or reduce overall broadcast quality to open up more bandwidth for other clients 120.

Therefore, a particular live broadcast may not reach all intended clients due to bandwidth limitations, or the degraded quality of the broadcast may make reception of the broadcast poor and unstable with frequent pauses for rebuffering or reacquisition. These deleterious effects may further result in loss of clientele, unacceptable delays in reception of the live content, or the prohibitive expense of a more powerful server and/or network connection which may then maintain a higher number of streams at a higher quality.

Therefore, a method for broadcasting live data over a network, that is more efficient than the conventional art would be an improvement. The present invention provides such an improvement.

SUMMARY OF THE INVENTION

The present invention provides, in various embodiments, a method and system for broadcasting live data over a network. Furthermore, the present invention provides a method and system for broadcasting live data over a network which allows access to the broadcast only to authenticated users. In addition, the present invention provides a method and system for broadcasting live data over a network which maintains the quality (e.g., bandwidth) of the live content being broadcast. Moreover, the present invention provides a method and system for broadcasting live data over a network which is cost efficient.

Embodiments of the present invention pertain to methods and system for broadcasting live data over a network are described. In one embodiment, live data is accessed. Next, a first client is authenticated. The live data is then broadcast to a first client, wherein the first client is capable of buffering and re-transmitting the live data. Next, a second client is authenticated. A list of clients receiving the live data is then sent to the second client. The second client then selects the first client from the list, contacts the first client, and then receives the live data from the first client.

In another embodiment, a server is broadcasting live content over a network such as the Internet. The broadcasting server authenticates a client to receive a broadcast and then either broadcasts directly to the client or allows the client to receive the broadcast from another device by selecting the device from a list of devices already receiving the broadcast. In so doing, the server can increase broadcast potential without subjecting clients to locked out conditions and/or reduced quality data associated with the server's bandwidth limitations.

In its various embodiments, the present invention can significantly reduce the bandwidth requirements of a network-based broadcast of live data. In addition, the present invention reduces the management responsibilities of the network-based broadcast. These and other objects and advantages of the various embodiments of the present invention will become recognized by those of ordinary skill in the art after having read the following detailed description of the embodiments that are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

PRIOR ART

DETAILED DESCRIPTION OF THE INVENTION

Figure 1:
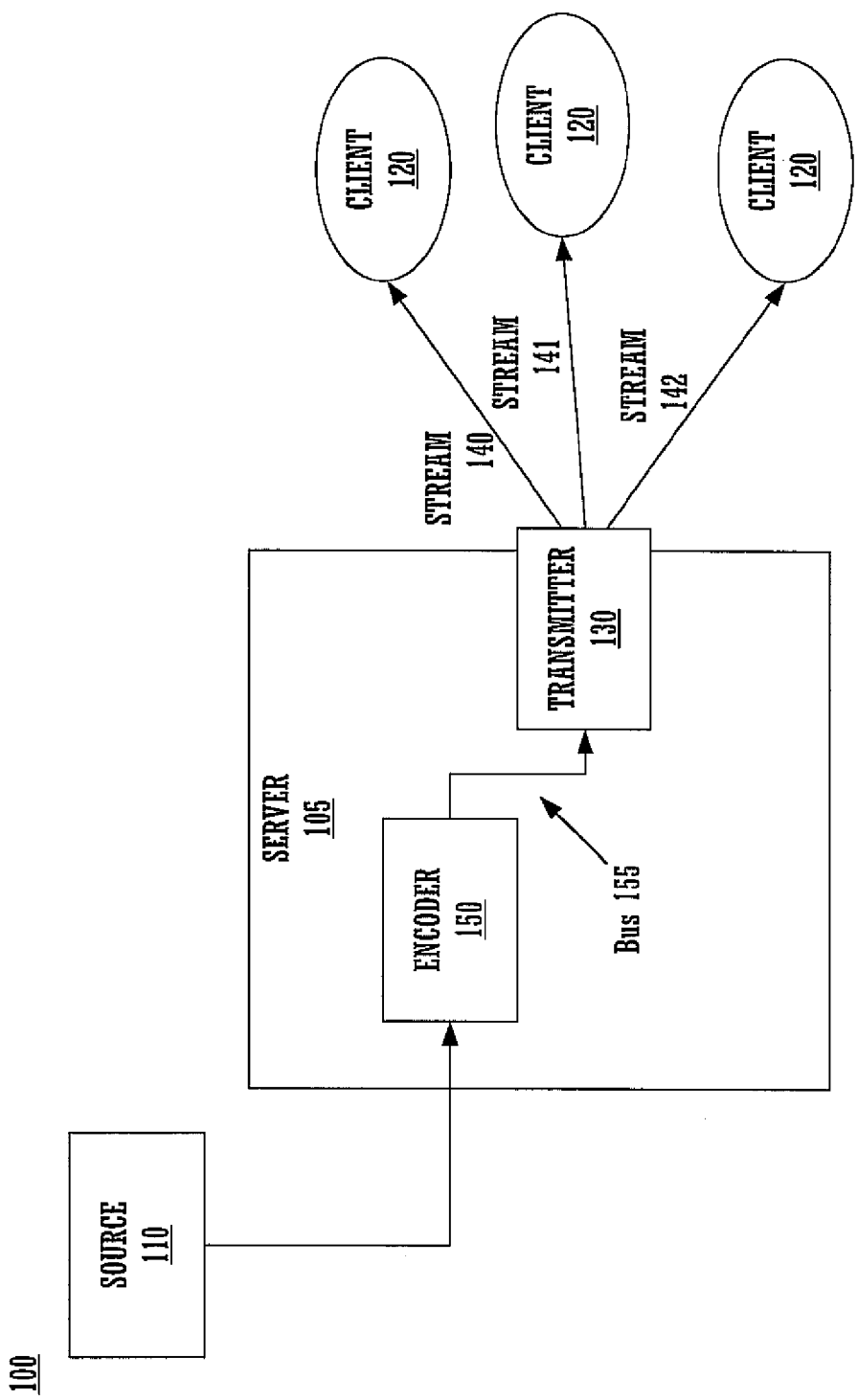
FIG. 1 illustrates the conventional way live content is broadcast over a network.

Reference will now be made in detail to embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, the present invention may be practiced without these specific details. In other instances, well-known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within an electronic computing device and/or memory system. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "accessing", "receiving", "processing", "creating", "broadcasting", "utilizing", "directing", "generating", "providing", "enqueuing", "dequeuing", "performing", or the like, refer to the action and processes of a computer system, or similar electronic computing device, that manipulates and transforms data. The data is represented as physical (electronic) quantities within the computing device's registers and memories and is transformed into other data similarly represented as physical quantities within the computing device's memories or registers or other such information storage, transmission, or display devices.

In general, the present invention allows a client that is receiving a live content broadcast from a server to not only receive the live content, but also retransmit the live content to another client. Thus, by having a client act as a second server, the live content may become available to more clients. As a result, a live broadcast may be viewed by more clients, and/or the overall quality of the broadcast may be increased. Therefore, by aggregating the broadcast clients available bandwidth, live data streams may be transmitted over a network (e.g., the Internet) to an unprecedented number of clients, at a higher quality level.

In one embodiment, the present invention reduces the number of clients directly accessing the broadcast server for the initial broadcast of live content over a network (e.g., the Internet). In so doing, the present invention may further allow the broadcast server to increase the bandwidth, and therefore the quality, of the live content being broadcast to each client. For example, if the broadcast server has a client or a number of clients watching a live video stream, and additional new clients also want to watch the same live video stream, the new clients may not necessarily receive their content from the broadcast server. In fact, the new clients may receive their content from the client/s already receiving the data stream.

That is, since the broadcast server has already sent the same live data to a client or clients, and that data has been buffered, the broadcast server may direct the already receiving client/s to broadcast the live data to the new clients. For example, since the server already knows which client/s are receiving the data it is sending as well as the transmission speeds at which the client/s are capable of sending and receiving, the server may direct any new clients to link to any of the other client/s already receiving the data.

In one embodiment, the client/s receiving the data may only rebroadcast the data to a new client after the broadcast server has signaled them about an incoming new link (e.g., a new client). In another embodiment, the client/s receiving the data may constantly rebroadcast the data being received. In general, a great benefit is realized when the broadcast server can transmit a single live video stream over a wide area network (WAN) to a single client in a local area network (LAN), and then that client can, in turn retransmit the live video stream to anyone else within the clients particular LAN. It should be appreciated that the re-transmitting of the live data may incur a slight delay due to the buffer and re-transmitting capabilities of the re-transmitting client. However, the slight delay which may be incurred is minimal. Thus, although the live data may be slightly delayed, it is nonetheless referred to herein as live data.

For example, a user may want to transmit a live broadcast of a wedding, child's baseball game, or meeting to other authorized clients (e.g., interested family members, friends, co-workers, or the like). Therefore, the user may use his own computing system as an initial server to broadcast or transmit the wedding, child's baseball game, or meeting over a network to the other interested parties. The first member of the interested party (e.g., relative, friend, co-worker, etc.) would then watch the broadcast and may also transmit it on to any other members of the interested party. Therefore, the entire interested party would have the opportunity to view the broadcast as it is happening. That is, they may see or hear what is said or done in real time with only a slight delay or no delay at all. Thus an initial broadcast to a network does not require a user to establish extreme amounts of bandwidth which may have high expense, portability, and convenience issues.

Figure 2:
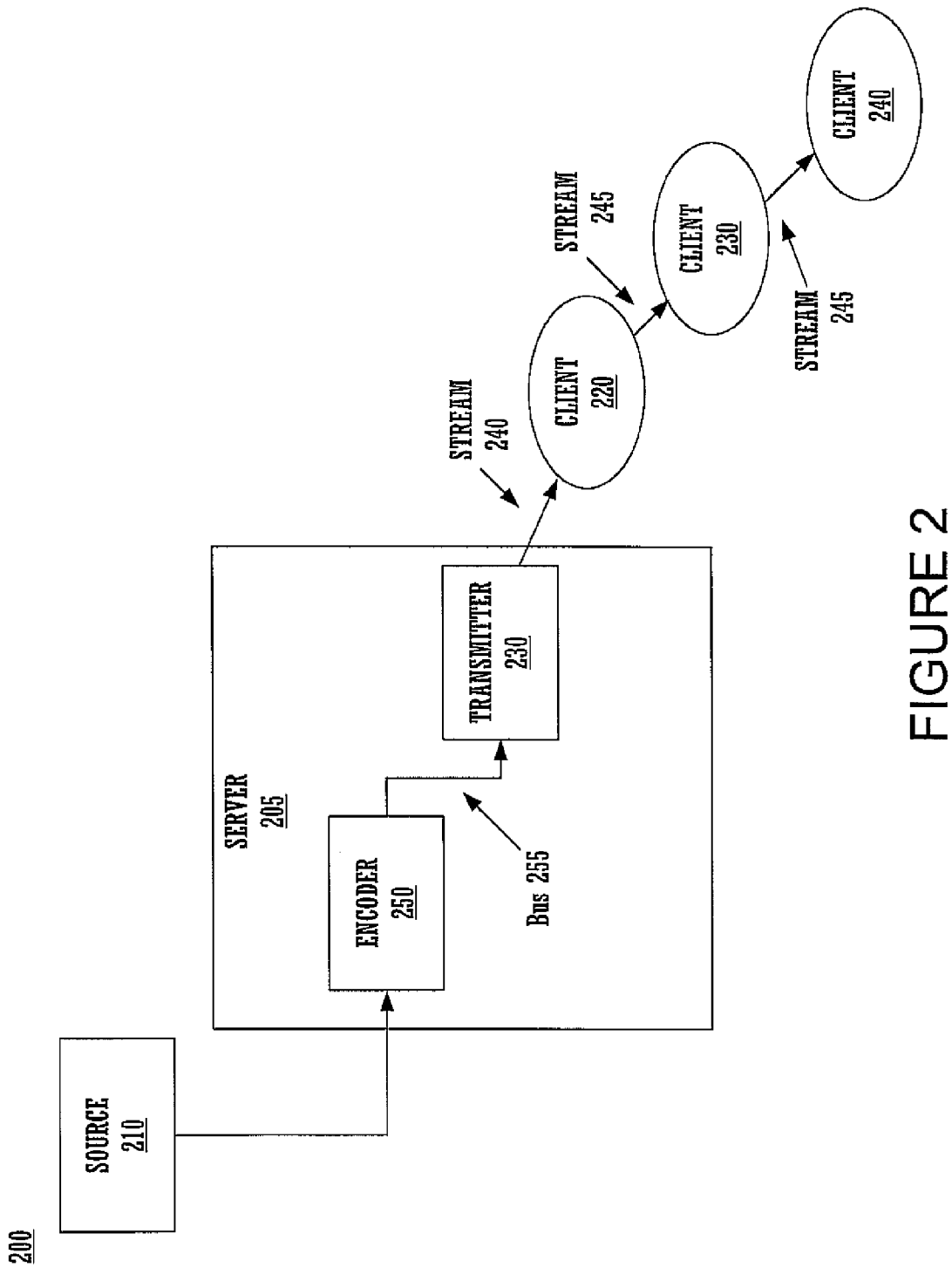
FIG. 2 illustrates one system for broadcasting live data over a network in accordance with one embodiment of the present invention.

With reference now to FIG. 2, one system for broadcasting live data over a network is shown in accordance with an embodiment of the present invention. System 200 includes a source 210, broadcast server 205, dedicated streams 240 and 245, and clients 220, 230, and 240. Source 210 may be an easy capture device (such as a microphone, video camera, net camera, or the like) which may be used to capture or "feed" the live data to a broadcast server 205. Broadcast server 205 includes encoder 250 bus 255 and transmitter 230 and may be utilized to broadcast (and possibly encode) live data. That is, broadcast server 205 may be any device which can encode the live data from a source 210 and transmit the live data over a network (e.g., the Internet). In one embodiment, broadcast server 205 may be a computing system such as computing system 700 of FIG. 7.

First client 220 may access broadcast server 205 to receive the live data. For example, first client 220 may access broadcast server 205 and receive the live data via an initial data stream 240. In addition, as described in more detail herein, first client 220 may buffer and retransmit the broadcast from broadcast server 205. In one embodiment, first client 220 may be a computing device such as computing system 700 of FIG. 7. As described in more detail herein, clients 230 and 240 may access broadcast server 205, authenticate with broadcast server 205 receive a list of clients (e.g., first client 220) receiving and re-transmitting the live broadcast, select a client (e.g., first client 220), inform the broadcast server 205, and then begin receiving the live broadcast from first client 220. Therefore, client 230 and/or client 240 may receive the live data via streams 245 instead of receiving the live data directly from broadcast server 205.

For example, once broadcast server 205 is initially contacted by a first client 220, broadcast server 205 may authenticate first client 220 and begin to broadcast the live data to first client 220 via stream 240. Then, when another client (e.g., second client 230) contacts broadcast server 205 to receive the live broadcast, the broadcasting server 205 may authenticate second client 230 to receive the broadcast. Second client 230 may then receive a list of clients already receiving the broadcast. Second client 230 may then select a client from the list (e.g., first client 220) and inform broadcast server of the selection. Second client 230 may then contact first client 220 which is already receiving and transmitting (or capable of transmitting) the broadcast (e.g., client 220). Once second client 230 contacts first client 220, second client 230 begins receiving the live broadcast from first client 220 via stream 245. In so doing, broadcast server 205 can increase broadcast potential without subjecting clients to locked out conditions and/or slowed data associated with the broadcast server's bandwidth limitations. In addition, broadcast server 205 can further reduce processing requirements by allowing second client 230 to select which client it desires to receive the live broadcast from.

Figure 3:
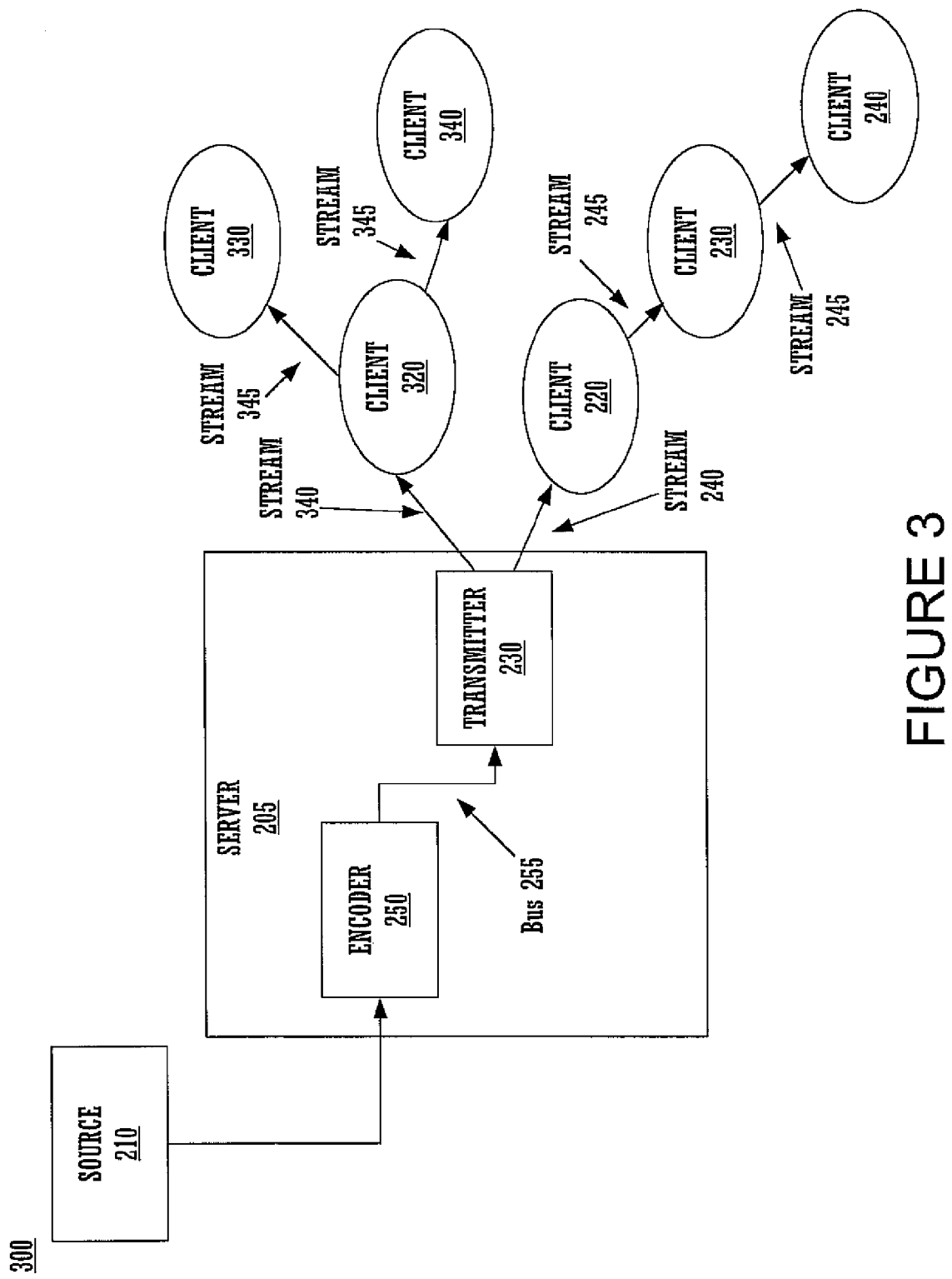
FIG. 3 illustrates another system for broadcasting live data over a network in accordance with one embodiment of the present invention.

With reference now to FIG. 3, another system for broadcasting live data over a network is shown in accordance with another embodiment of the present invention. Specifically, system 300 shows the incorporation of a second branch of clients. For example, system 300 has a second stream 340 transmitted over a network (e.g., the Internet). In so doing, system 300 has the ability to add additional clients 330 and 340 to the network link via network streams 345. This is important since too many links in one re-transmit network may degrade the timeliness of the live data due to the possible rebuffering of the data stream per client.

As stated herein, FIG. 3 also illustrates the ability of a client (e.g., client 320) that is receiving the data stream (e.g. stream 340) from the server 205 to retransmit to more than one client. For example, client 320 may be broadcasting to a client 330 via stream 345 as well as client 340 via a separate stream 345. Thus, another branch is developed in the re-broadcasting network of system 300. This may be useful in the case of a client 320 residing behind a firewall and re-broadcasting to other clients within a LAN as described in more detail herein.

Figure 4:
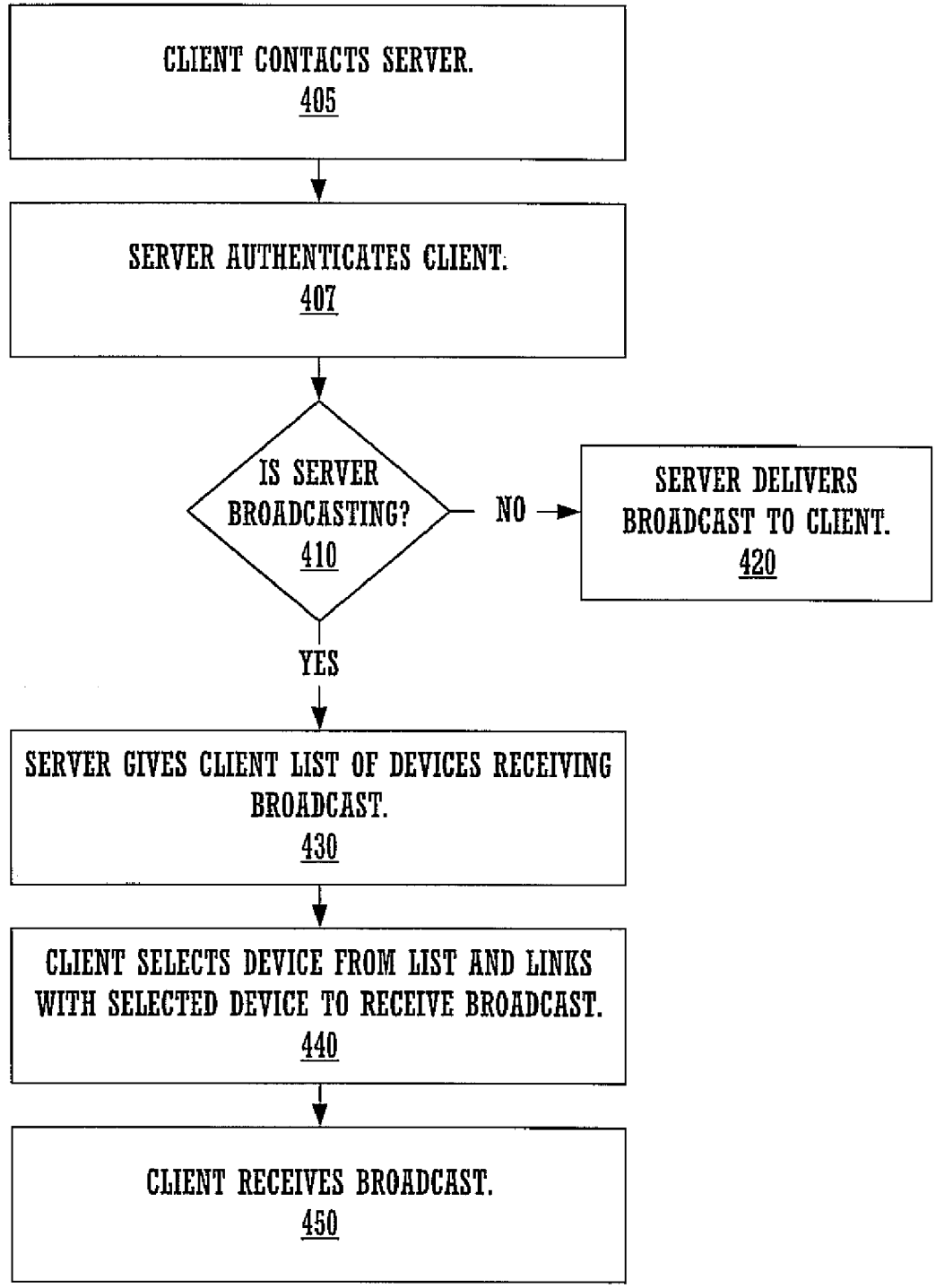
FIG. 4 is a flowchart of a process for a device to access a live data broadcast in accordance with one embodiment of the present invention.

With reference now to FIG. 4, a flowchart of a process for a device to access a live data broadcast is shown in accordance with one embodiment of the present invention. It is appreciated that the steps of flowchart 400 are exemplary and that some steps may be skipped and other steps may be added depending on the plurality of possible contacting and re-transmitting protocols which may be used by the plethora of possible client devices. The present steps (e.g., steps 405 through 450) are meant to illustrate one of the plurality of possible ways in which a client may receive a live broadcast.

With reference now to step 405 of FIG. 4 and FIG. 2, a client contacts a broadcast server 205 to obtain a live data broadcast. As described herein, the client may contact broadcast server 205 via a network connection.

With reference now to step 407 of FIG. 4 and FIG. 2, once the client contacts broadcast server 205, broadcast server 205 may authenticate the client to ensure that the client has permission to access to the desired live broadcast. For example, if the live broadcast is a business meeting, the clients involved in the meeting may be the only clients authorized to receive the broadcast. Therefore, if an unauthorized user contacted broadcast server 205, or any of the other clients receiving the live broadcast, the unauthorized user would be denied access and could not receive the original live broadcast or any re-transmissions of the live broadcast. In one embodiment, the authentication may be based on a pre-determined status (e.g., CEO of a company may have access to all live broadcasts received within the company firewall), or the authentication may be based on specific situational dictation (e.g., competing clients may be allowed access to the same live broadcast if a universal dispersion of the information is required).

With reference now to step 410 of FIG. 4 and FIG. 2, after authenticating the client broadcast server 205 may check to see if the desired live data is being broadcast over a network. For example, broadcast server 205 may check to see the number of streams 240 related to the desired live data which are being broadcast over the network.

With reference now to step 420 of FIG. 4 and FIG. 2, if broadcast server 205 is not broadcasting the desired live data over the network, then broadcast server 205 will initiate a stream 240 to deliver the live broadcast to first client 220.

However, with reference now to step 430 of FIG. 4 and FIG. 2, if broadcast server 205 is broadcasting the desired live data over the network, then in one embodiment, broadcast server 205 may maintain a list of all clients receiving and transmitting (or capable of transmitting) the broadcast data. Therefore, broadcast server 205 may provide the second client with a list of the devices which are already receiving the live broadcast. For example, if broadcast server 205 is broadcasting the desired live data over the network, then in one embodiment, broadcast server 205 may give the second client 230 a list of devices (e.g., first client 220) which are already receiving the live broadcast.

With reference now to step 440 of FIG. 4 and FIG. 2, the second client will then select the device from which it will receive the live broadcast. For example, second client 230 may select first client 220 as its source for receiving the live data. In another embodiment, broadcast server 205 may direct the second client 230 to receive the broadcast from a specified first client 220 instead of allowing the second client 230 to select first client 220 from a list. In one embodiment, during the login process, the second client 230 may select the first client 220 based on broadcasting properties of the first client 220 such as IP address, speed of connection, number of clients already receiving from the first client, history of first client up-time, and the like.

With reference now to step 450 of FIG. 4 and FIG. 2, the second client may receive the live broadcast from the first client. For example, second client 230 may receive the live broadcast from first client 220. As stated herein, first client 220 may be constantly re-transmitting the live data, or first client 220 may not start re-transmitting the live data until broadcast server 205 authorizes it to do so. Therefore, in one embodiment, access to the live broadcast may be controlled by broadcast server 205.

Figure 5:
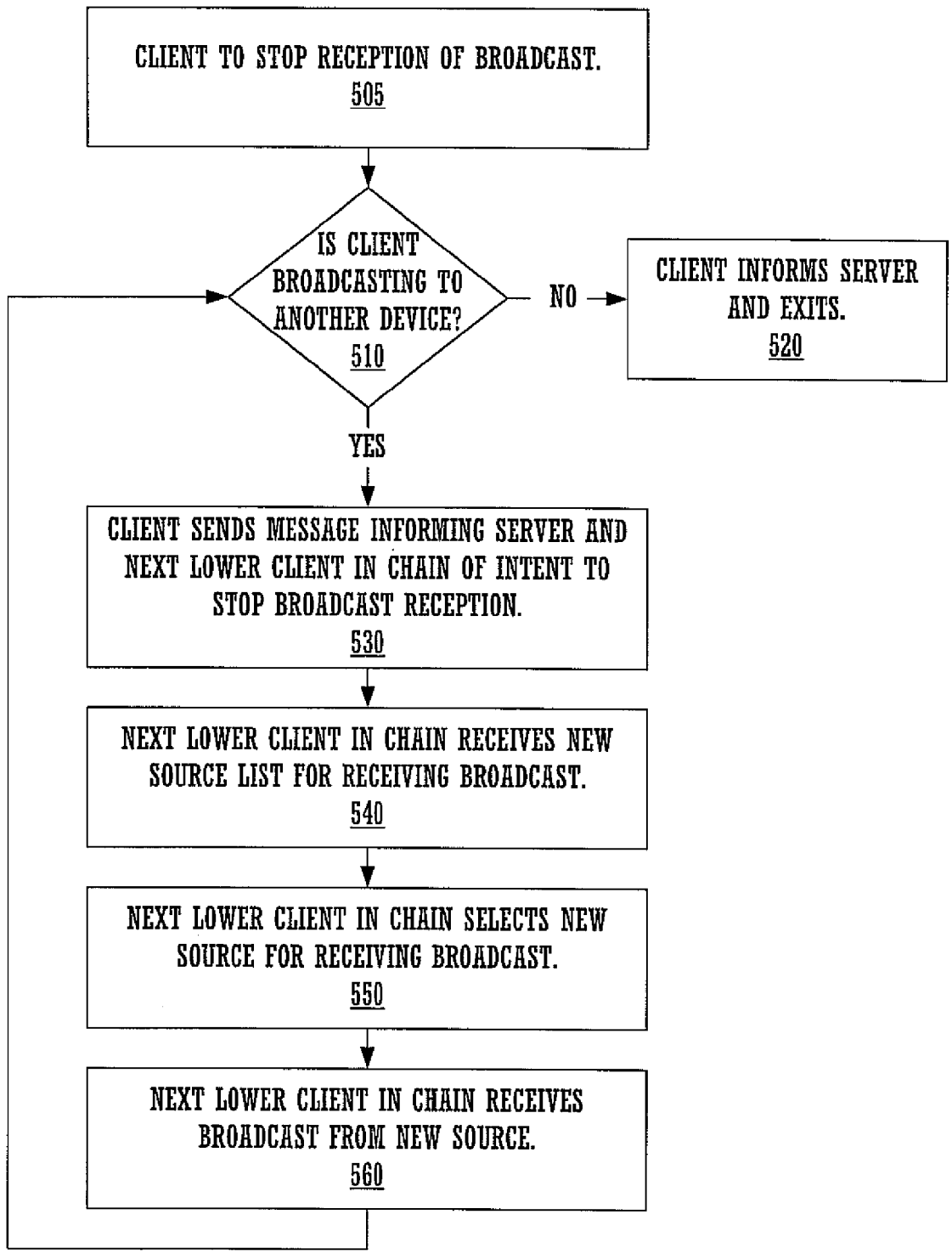
FIG. 5 is a flowchart of a process for exiting a live data broadcast in accordance with one embodiment of the present invention.

With reference now to FIG. 5, a flowchart of a process for exiting a live data broadcast is shown in accordance with one embodiment of the present invention. Specifically, due to the possibility that a client wishing to exit a broadcast may be a link in the receive/re-transmit chain, flowchart 500 is utilized as one embodiment for maintaining the integrity of the live broadcast for all clients involved. However, it is appreciated that the steps of flowchart 500 are exemplary and that some steps may be skipped and other steps may be added depending on the plurality of possible exit protocols which may be used by the plethora of possible client devices. The present steps (e.g., steps 505 through 560) are meant to illustrate one of the plurality of possible ways in which a client may exit a live broadcast.

With reference now to step 505 of FIG. 5 and FIG. 2, the client receiving the live broadcast contacts broadcast server 205 and requests to stop receiving the broadcast. This step may be initiated by a client or a device that has received a command to stop reception by a client. Step 505 may also be utilized by broadcast server 205 to stop the live broadcast to a client. For example, broadcast server 205 may stop the live broadcast to a client due to overdue fees, another clients' explicit exclusion demand, improper actions of the client, or the like. In any case, the status of the departing client should be obtained.

With reference still now to step 510 of FIG. 5 and FIG. 2, a query of whether or not the client is broadcasting to another device is necessary. If the client is broadcasting to another device then a warning may be necessary to ensure that the integrity of the live broadcast is not disrupted.

With reference still to FIG. 2, and now to step 520 of FIG. 5, if the client is not broadcasting to another device, then the client may inform broadcast server 205 of its departure and stop reception of stream 240. For example, if client 240 is departing, then since client 240 is not re-transmitting to another client, it may simply inform broadcast server 205 and stop receiving the live broadcast.

However, with reference now to step 530 of FIG. 5 and FIG. 2, if the client is broadcasting to another device, then the client may send a message informing broadcast server 205 and the next lower device in the chain of the intent to stop broadcast reception and re-transmission. For example, client 230 may transmit a signal to broadcast server 205 and client 240 of its intent to stop reception and re-transmission. In another embodiment, the departing client 230 may simply send the message to broadcast server 205. Then, broadcast server 205 may either inform client 240 of the imminent departure of client 230 or may simply reassign client 240 to a new transmitter. In yet another embodiment, the departing client 230 may simply send the message to the next lower client 240. Then, client 240 may either inform broadcast server 205 of the imminent departure of client 230 or may simply reassign itself to a new transmitter. In addition to sending a message, client 230 may also keep receiving and transmitting the live data until client 240 transfers to a new transmitter.

With reference now to step 540 of FIG. 5 and FIG. 2, the next lower client in the chain may receive a new source list for receiving the live broadcast. For example, client 240 may receive a source list from broadcast server 205 with client 220 being made available as a source. In another embodiment, as stated herein, broadcast server 205 may simply reassign client 240 to a new transmitter (e.g., client 220). In addition, the next lower client may maintain a list of all other clients accessing the broadcast at a lower level in its specific chain. In so doing, the next lower client may ensure that it will not default to receive the broadcast from another client accessing its own broadcast at a lower level. For example, if client 220 were departing, then client 230 would not want to move its reception to the transmissions of client 240.

With reference still now to step 550 of FIG. 5 and FIG. 2, the next lower client in the chain selects the new source for receiving the live broadcast. For example, if client 230 is departing, then client 240 may select client 220 as its new source for receiving the live broadcast. In another embodiment, as stated herein, server 205 may simply assign client 240 to a new transmitter. In yet another embodiment, when client 230 departs, client 240 may simply move up the chain and begin receiving the live broadcast from client 220 without selecting from a list. However, in such a case, it must be ensured that the buffer maintained by client 230 was not so large that a significant portion of the live broadcast will be lost during the changeover to reception from client 210. That is, a client should not step up in the branches of the chain an amount of time greater than what is stored in the clients' buffer.

With reference now to step 560 of FIG. 5 and FIG. 2, the next lower client in the chain begins receiving the live broadcast from the new transmitter. For example, client 240 will begin receiving the live broadcast from client 220. After the next lower client has begun reception from another transmitter, the departing client moves back to step 510 wherein the question of the client broadcasting to another device is asked. If the answer to the question is no then the step 520 is performed and the client may depart. However, if the answer is yes then the process must begin again at step 530.

Figure 6:
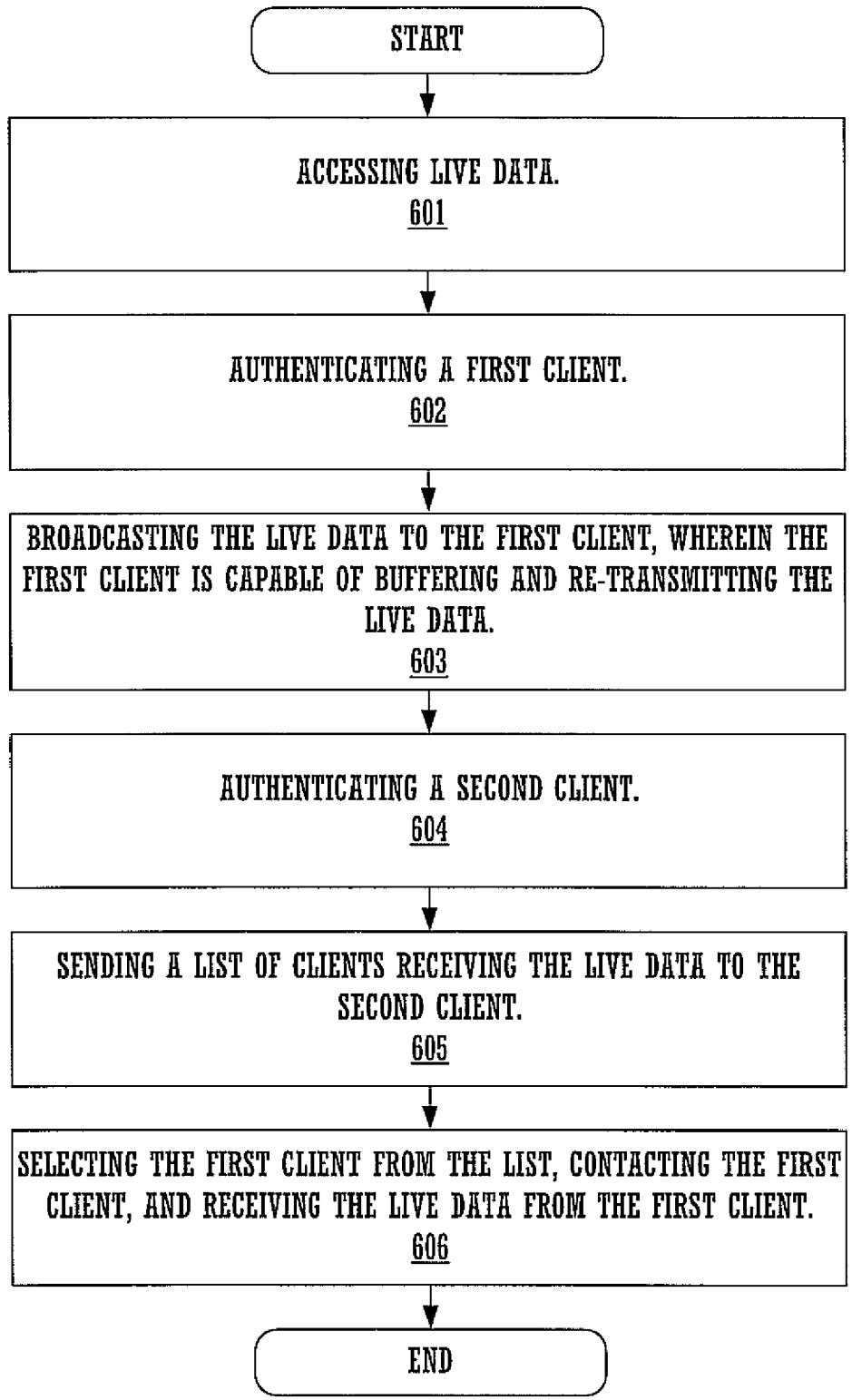
FIG. 6 is a flowchart of a process for broadcasting live data over a network according to an embodiment of the present invention.

With reference now to FIG. 6, a flowchart of a process for broadcasting live data over a network is shown in accordance with an embodiment of the present invention.

With reference now to step 601 of FIG. 6, live data may be accessed. As stated herein, the live data may be audio and/or video data transmitted as live or real time.

With reference now to step 602 of FIG. 6, a first client is authenticated. As stated herein, the authentication of the first client may be based on a static authentication (e.g., a CEO may have access to all live broadcasts behind the company firewall), or a dynamic authentication (e.g., the authentication may be provided or revoked dependent on a specific situation).

With reference now to step 603 of FIG. 6, in one embodiment the live data may be broadcast to a first client capable of buffering and re-transmitting the live data. In one embodiment, the live data may be broadcast to the first client via a broadcast server. As stated herein, the client may be any type of computing device capable of accessing a network and receiving live data. For example, the client may be a computer, a wireless telephone, a personal digital assistant (PDA), or the like which can access a network as well as playback and re-transmit data.

In one embodiment, in order to motivate clients to re-transmit the live broadcast, a fee (e.g., brownie points, demerits, money, access time, etc.) may be charged per client per amount of broadcast received, and a reward (e.g., brownie points, merits, money, access time, etc.) may be paid per client per amount of broadcast transmitted.

In another embodiment, a first client may be assigned as a high priority client. That is, the first client may be a receive only client. For example, if the first client 220 is a client such as a CEO, the first client may inform broadcast server 205 that it will not re-transmit the live broadcast in order to maintain a higher personal performance level. In yet another embodiment, the second client may be assigned as a high priority client. For example, if the first client 220 is a client such as a CEO, the first client may inform broadcast server 205 that it will not re-transmit the live broadcast in order to maintain a higher personal performance level.

With reference now to step 604 of FIG. 6, a second client is authenticated. As stated herein, the authentication of the second client may be based on a static authentication (e.g., a CEO may have access to all live broadcasts behind the company firewall), or a dynamic authentication (e.g., the authentication may be provided or revoked dependent on a specific situation).

Referring now to step 605 of FIG. 6, in one embodiment, a list of the clients receiving the live data is sent to the second client. For example, when the second client 230 contacts broadcast server 205, broadcast server 205 may transmit the list to second client 230. Included in the list may be first client 220 and any other clients receiving the live broadcast.

Referring now to step 606, of FIG. 6, the second client may select to receive the live data from the first client, contact the first client, and then begin reception of the live data from the first client. For example, after second client 230 receives the list of clients from broadcast server 205, the second client 230 may select first client 220. Then, second client 230 may contact first client 220 and request stream 245 to be established. Once stream 245 is established, second client 230 may begin reception from first client 220. In addition, second client 230 may inform the broadcast server 205 of the selection in order that broadcast server 205 may update its database of clients receiving and re-transmitting the broadcast data.

In addition, the broadcast server may maintain a bandwidth reserve to temporarily transmit to a second client in case of a fault occurring with the first client. For example, if the first client unexpectedly fails (or drops out), the broadcast server may temporarily transmit the live data to the second client until a suitable replacement first client can be identified and/or utilized. In another embodiment, if the first client unexpectedly fails (or drops out), the broadcast server may take over the transmission of the live data to the second client.

Figure 7:
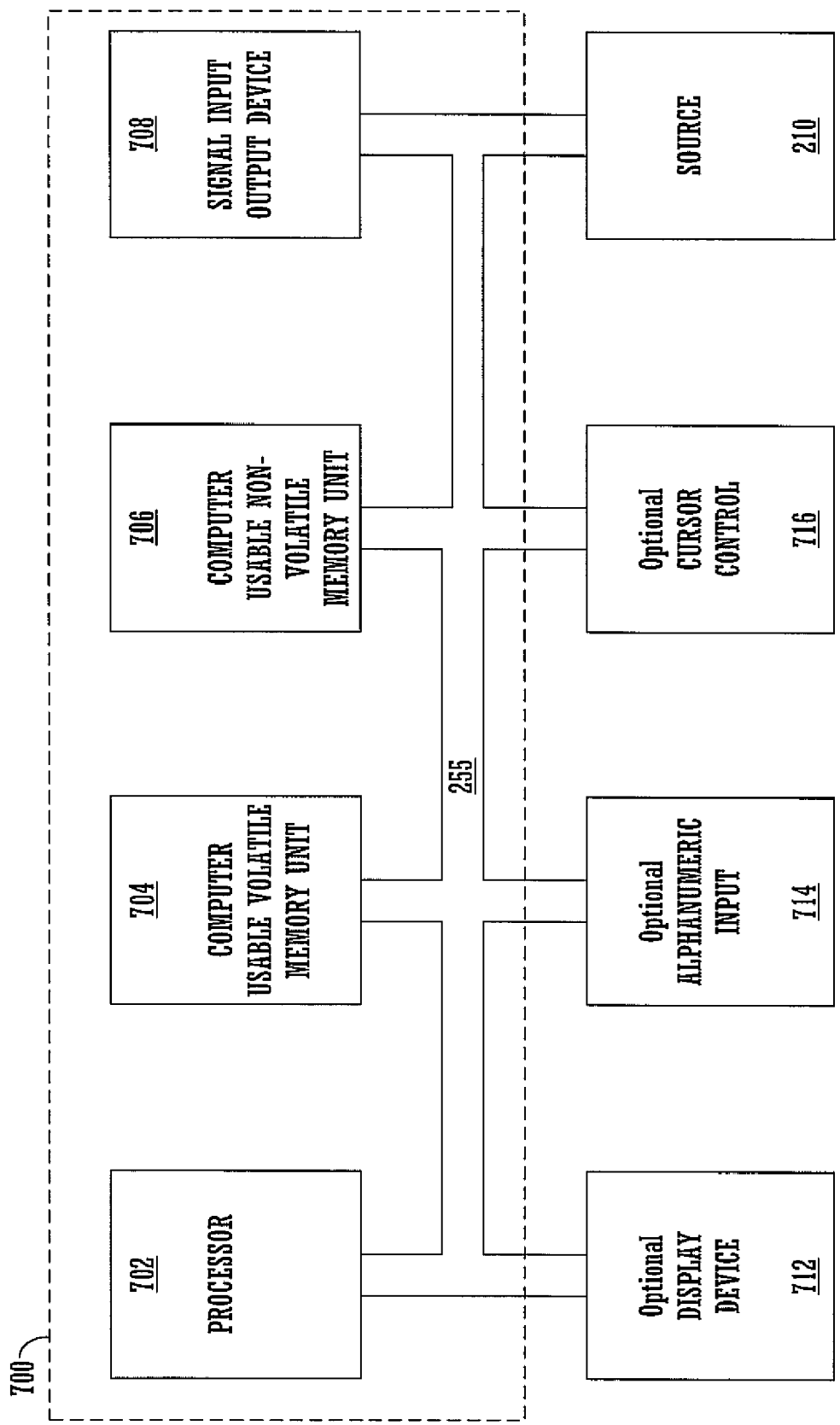
FIG. 7 is a block diagram of exemplary circuitry of a computing system that may be used as a platform to implement embodiments of the present invention.

With reference now to FIG. 7, a block diagram of an embodiment of an exemplary computer system 700 used in accordance with the present invention. It should be appreciated that system 700 is not strictly limited to be a computer system. As such, system 700 of the present embodiment is well suited to be any type of computing device (e.g., server computer, portable computing device, desktop computer, mobile phone, pager, personal digital assistant, etc.). Within the following discussions of the present invention, certain processes and steps are discussed that are realized, in one embodiment, as a series of instructions (e.g., software program) that reside within computer readable memory units of computer system 700 and executed by a processor(s) of system 700. When executed, the instructions cause computer 700 to perform specific actions and exhibit specific behavior that is described in detail herein.

Computer system 700 of FIG. 7 comprises an address/data bus 255 for communicating information, one or more central processors 702 coupled with bus 255 for processing information and instructions. Central processor unit(s) 702 may be a microprocessor or any other type of processor. The computer 700 also includes data storage features such as a computer usable volatile memory unit 704 (e.g., random access memory, static RAM, dynamic RAM, etc.) coupled with bus 255 for storing information and instructions for central processor(s) 702, a computer usable non-volatile memory unit 706 (e.g., read only memory, programmable ROM, flash memory, EPROM, EEPROM, etc.) coupled with bus 255 for storing static information and instructions for processor(s) 702. System 700 also includes one or more signal generating and receiving devices 708 coupled with bus 255 for enabling system 700 to interface with other electronic devices and computer systems. The communication interface(s) 708 of the present embodiment may include wired and/or wireless communication technology.

Optionally, computer system 700 may include an alphanumeric input device 714 including alphanumeric and function keys coupled to the bus 255 for communicating information and command selections to the central processor(s) 702. The computer 700 can include an optional cursor control or cursor directing device 716 coupled to the bus 255 for communicating user input information and command selections to the central processor(s) 702. The cursor-directing device 716 may be implemented using a number of well known devices such as a mouse, a track-ball, a track-pad, an optical tracking device, and a touch screen, among others. Alternatively, it is appreciated that a cursor may be directed and/or activated via input from the alphanumeric input device 714 using special keys and key sequence commands. The present embodiment is also well suited to directing a cursor by other means such as, for example, voice commands.

The system 700 of FIG. 7 may also include one or more optional source devices 210 such as an easy capture device (e.g., camera, microphone, etc.) coupled with bus 255 for providing live content to system 700. An optional display device 712 is coupled to bus 255 of system 700 for displaying video and/or graphics. It should be appreciated that optional display device 712 may be a cathode ray tube (CRT), flat panel liquid crystal display (LCD), field emission display (FED), plasma display or any other display device suitable for displaying video and/or graphic images and alphanumeric characters recognizable to a user.

Thus, the present invention provides, in various embodiments, a method and system for broadcasting live data over a network. Furthermore, the present invention provides a method and system for broadcasting live data over a network which allows access to the broadcast only to authenticated users. In addition, the present invention provides a method and system for broadcasting live data over a network which maintains the quality (e.g., bandwidth) of the live content being broadcast. Moreover, the present invention provides a method and system for broadcasting live data over a network which is cost efficient.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

What is claimed is:

1. A method for broadcasting live data over a network comprising:
   accessing live data;
   authenticating a first client;
   broadcasting from a server, the live data to the first client, wherein the first client buffers and re-transmits the live data;
   authenticating a second client; and
   sending a list of clients receiving the live data to the second client, wherein the second client performs:
      selecting the first client from the list;

contacting the first client; and receiving the live data from the first client;

the first client signaling the second client informing the second client of a departure of the first client; and following said signaling, said first client terminating said re-transmitting.

2. The method of claim 1 further comprising:

maintaining a list of clients authorized to receive the live data.

3. The method of claim 1 wherein the second client selects the first client from the list of clients based on broadcasting properties of the first client comprised of:

IP address, speed of connection, number of clients already receiving the live data from the first client, and history of first client up-time.

4. The method of claim 1 further comprising:

the first client maintaining the buffering and re-transmitting of the live data to the second client until the second client transfers to a new transmitter.

5. The method of claim 4 further comprising:

prohibiting the second client from receiving the live data from any other clients accessing the broadcast at a lower level.

6. The method of claim 1 further comprising:

charging a fee per client per amount of live data received; and providing a reward per client per amount of live data transmitted.

7. A computer system comprising:

a) a first client;

b) a second client; and c) a server system comprising:

a bus;

a memory unit coupled with the bus; and a processor coupled with the bus for executing a method for broadcasting live data over a network comprising:

accessing live data;

maintaining a list of clients authorized to receive the live data;

authenticating the first client;

broadcasting the live data to the first client, wherein the first client is capable of buffering and re-transmitting the live data;

authenticating the second client;

sending a list of clients receiving the live data to the second client; and wherein the second client performs:

selecting the first client from the list;

contacting the first client; and receiving the live data from the first client;

wherein before the first client stops the re-transmitting of the live data, the first client:

signals the second client informing the second client of the departure status of the first client; and maintains the buffering and re-transmitting of the live data to the second client until the second client transfers to a new transmitter.

8. The computer system of claim 7 wherein the second client selects the first client based on broadcasting properties of the first client comprised of:

IP address, speed of connection, number of clients already receiving the live data from the first client, and history of first client up-time.

9. The computer system of claim 7 wherein the second client is prohibited from receiving the live data from any other clients accessing the broadcast at a lower level in the same broadcast chain.

10. The computer system of claim 7 wherein said server further performs:

charging a fee per client per amount of live data received; and providing a reward per client per amount of live data transmitted.

11. A computer network comprising:

a) a server comprising a processor for performing a method of broadcasting live data comprising:

receiving live data;

maintaining a list of clients authorized to receive the live data;

authenticating a first client;

broadcasting the live data to the first client, wherein the first client is capable of buffering and re-transmitting the live data;

authenticating a second client; and sending a list of clients receiving the live data to the second client;

b) wherein the second client further comprises a processor for:

receiving the list of clients receiving the live data including the first client;

selecting the first client from the list;

contacting the first client; and receiving the live data from the first client; and c) wherein the first client transmits a signal to the second client informing the second client of the departure status of the first client; and the first client maintains the receiving and transmitting of the live data to the second client until the second client transfers to a new transmitter;

wherein the second client is prohibited from receiving the live data from any other clients accessing the broadcast at a lower level.

12. The computer network of claim 11 wherein the second client selects the first client based on broadcasting properties of the first client comprised of:

IP address, speed of connection, number of clients already receiving the live data from the first client, and history of first client up-time.

13. The computer network of claim 11 wherein the second client is a high priority client.

14. The computer network of claim 13 wherein the high priority client is a receive only client.

* * * * *